US009683147B2

(12) United States Patent
Stevenson et al.

(10) Patent No.: US 9,683,147 B2
(45) Date of Patent: Jun. 20, 2017

(54) ENCAPSULATED POLYMERIZATION INITIATORS, POLYMERIZATION SYSTEMS AND METHODS USING THE SAME

(71) Applicant: Sirrus, Inc., Loveland, OH (US)

(72) Inventors: Peter Rulon Stevenson, Loveland, OH (US); Aniruddha Sudhir Palsule, Cincinnati, OH (US); Jeffrey M. Sullivan, Goshen, OH (US)

(73) Assignee: Sirrus, Inc., Loveland, OH (US)

( * ) Notice: Subject to any disclaimer, the term of this patent is extended or adjusted under 35 U.S.C. 154(b) by 0 days.

(21) Appl. No.: 15/094,705

(22) Filed: Apr. 8, 2016

(65) Prior Publication Data

US 2016/0347976 A1  Dec. 1, 2016

Related U.S. Application Data

(63) Continuation of application No. 14/725,532, filed on May 29, 2015, now Pat. No. 9,334,430.

(51) Int. Cl.

| | | |
|---|---|---|
| *C09J 135/02* | (2006.01) | |
| *C08K 3/00* | (2006.01) | |
| *C08K 5/00* | (2006.01) | |
| *C08F 18/02* | (2006.01) | |
| *C08F 18/14* | (2006.01) | |
| *C08F 16/36* | (2006.01) | |

(52) U.S. Cl.
CPC ........... *C09J 135/02* (2013.01); *C08K 3/0008* (2013.01); *C08K 5/0008* (2013.01)

(58) Field of Classification Search
None
See application file for complete search history.

(56) References Cited

U.S. PATENT DOCUMENTS

| | | | |
|---|---|---|---|
| 2,212,506 | A | 8/1940 | Bachman et al. |
| 2,245,567 | A | 6/1941 | Brant et al. |
| 2,277,479 | A | 3/1942 | D'Alelio |
| 2,313,501 | A | 3/1943 | Bachman et al. |
| 2,330,033 | A | 9/1943 | D'Alelio |
| 2,403,791 | A | 7/1946 | D'Alelio |
| 2,726,204 | A | 12/1955 | Kilbourne et al. |
| 2,730,457 | A | 1/1956 | Green et al. |
| 3,042,710 | A | 7/1962 | Dickstein et al. |
| 3,140,276 | A | 7/1964 | Forster |
| 3,197,318 | A | 7/1965 | Halpern et al. |
| 3,203,915 | A | 8/1965 | D'Alelio |
| 3,221,745 | A | 12/1965 | Coover, Jr. et al. |
| 3,385,777 | A | 5/1968 | Haycock et al. |
| 3,427,250 | A * | 2/1969 | Haas ...................... B01J 13/185 264/4.7 |
| 3,489,663 | A | 1/1970 | Bayer et al. |
| 3,523,097 | A | 8/1970 | Coover, Jr. et al. |
| 3,557,185 | A | 1/1971 | Ito et al. |
| 3,591,676 | A | 7/1971 | Hawkins et al. |
| 3,595,869 | A | 7/1971 | Shuman |
| 3,677,989 | A | 7/1972 | Jenkinson |
| 3,728,373 | A | 4/1973 | Imohel et al. |
| 3,758,550 | A | 9/1973 | Eck et al. |
| 3,759,797 | A | 9/1973 | Masunaga et al. |
| 3,923,836 | A | 12/1975 | Bender et al. |
| 3,936,486 | A | 2/1976 | Egger et al. |
| 3,940,362 | A | 2/1976 | Overhults |
| 3,945,891 | A | 3/1976 | Aal et al. |
| 3,966,562 | A | 6/1976 | Mukushi et al. |
| 3,975,422 | A | 8/1976 | Buck |
| 3,978,422 | A | 8/1976 | Rheinfelder |
| 3,995,489 | A | 12/1976 | Smith et al. |
| 4,001,345 | A | 1/1977 | Gorton et al. |
| 4,004,984 | A | 1/1977 | Margen |
| 4,018,656 | A | 4/1977 | Rogers et al. |
| 4,035,243 | A | 7/1977 | Katz et al. |
| 4,036,985 | A | 7/1977 | Amato et al. |
| 4,046,943 | A | 9/1977 | Smith et al. |
| 4,049,698 | A | 9/1977 | Hawkins et al. |
| 4,056,543 | A | 11/1977 | Ponticello |
| 4,079,058 | A | 3/1978 | Ackermann et al. |
| 4,080,238 | A | 3/1978 | Wolinski et al. |
| 4,083,751 | A | 4/1978 | Choi et al. |
| 4,102,809 | A | 7/1978 | Smith et al. |
| 4,105,688 | A | 8/1978 | Arni et al. |
| 4,118,422 | A | 10/1978 | Klein |
| 4,140,584 | A | 2/1979 | Margen |

(Continued)

FOREIGN PATENT DOCUMENTS

| | | |
|---|---|---|
| CN | 102901754 A | 1/2013 |
| DE | 19508049 A1 | 9/1996 |

(Continued)

OTHER PUBLICATIONS

M. Ware et al.: "DBU: An Efficient Catalyst for Knoeveganel Condensation under Solvent-free Condition," Bulletin of the Catalysis Society of India, (2007), vol. 6, pp. 104-106.
V. G. Nenajdenko et al.: "Reaction of 2-Methylene-1,3-Dicarbonyl Compounds Containing a CF3-Group with 1,3-Dienes," Tetrahedron, (2000), vol. 56, pp. 6549-6556.
J. S. Yadav et al.: "Phosphane-Catalyzed Knoevenagel Condensation: a Facile Synthesis of a-Cyanoacrylates and a-Cyanoacrylonitriles," Eur. J. Orq. Chem. (2004), pp. 546-551.
B. C. Ranu et al.: "Ionic Liquid as Catalyst and Reaction Medium—a Simple, Efficient and Green Procedure for Knoevenagel Condensation of Aliphatic and Aromatic Carbonyl Compounds Using a Task-Specific Basic Ionic Liquid," Euro. J. Org. Chem., (2006), pp. 3767-3770.
H. A. Oskooie et al.: "On Water: an Efficient Knoevenagel Condensation using 12-Tungstophosphoric Acid as a Reusable Green Catalyst," Synthetic Communications, (2006), vol. 36, pp. 2819-2823.

(Continued)

*Primary Examiner* — Vu A Nguyen
(74) *Attorney, Agent, or Firm* — Ulmer & Berne, LLP (57) ABSTRACT

A polymerizable system includes a curable composition and one or more encapsulated initiator particles. The curable composition can include one or more 1,1-disubstituted alkene compounds and the encapsulated initiator particles can include one or more polymerization initiators encapsulated by a cured composition. The cured composition includes one or more 1,1-disubstituted alkene compounds.

18 Claims, 3 Drawing Sheets

(56) References Cited

U.S. PATENT DOCUMENTS

| | | | |
|---|---|---|---|
| 4,148,693 A | 4/1979 | Williamson |
| 4,154,914 A | 5/1979 | Kuraya |
| 4,160,864 A | 7/1979 | Ponticello et al. |
| 4,176,012 A | 11/1979 | Bryant |
| 4,186,058 A | 1/1980 | Katz et al. |
| 4,186,060 A | 1/1980 | Katz et al. |
| 4,198,334 A | 4/1980 | Rasberger |
| 4,224,112 A | 9/1980 | Childs |
| 4,229,263 A | 10/1980 | Childs |
| 4,236,975 A | 12/1980 | Childs |
| 4,237,297 A | 12/1980 | Rody et al. |
| 4,243,493 A | 1/1981 | Gruber et al. |
| 4,256,908 A | 3/1981 | Nishimura et al. |
| 4,282,067 A | 8/1981 | Katz et al. |
| 4,282,071 A | 8/1981 | Sherrod |
| 4,291,171 A | 9/1981 | Baum et al. |
| 4,313,865 A | 2/1982 | Teramoto et al. |
| 4,319,964 A | 3/1982 | Katz et al. |
| 4,329,479 A | 5/1982 | Yabutani et al. |
| 4,396,039 A | 8/1983 | Klenk et al. |
| 4,399,300 A | 8/1983 | Prange et al. |
| 4,411,740 A | 10/1983 | Flaningam et al. |
| 4,440,601 A | 4/1984 | Katz et al. |
| 4,440,910 A | 4/1984 | O'Connor |
| 4,443,624 A | 4/1984 | Prange et al. |
| 4,444,928 A | 4/1984 | Karrer |
| 4,450,067 A | 5/1984 | Angevine et al. |
| 4,504,658 A | 3/1985 | Narisada et al. |
| 4,510,273 A | 4/1985 | Miura et al. |
| 4,517,105 A | 5/1985 | Laemmle et al. |
| 4,539,423 A | 9/1985 | Itatani et al. |
| 4,556,649 A | 12/1985 | Salzburg et al. |
| 4,560,723 A | 12/1985 | Millet et al. |
| 4,578,503 A | 3/1986 | Ishikawa et al. |
| 4,584,064 A | 4/1986 | Ciais et al. |
| 4,613,658 A | 9/1986 | Mathias et al. |
| 4,698,333 A | 10/1987 | Fauss et al. |
| 4,720,543 A | 1/1988 | McPherson et al. |
| 4,724,053 A | 2/1988 | Jasne |
| 4,727,801 A | 3/1988 | Yokoi et al. |
| 4,728,701 A | 3/1988 | Jarvis et al. |
| 4,736,056 A | 4/1988 | Smith et al. |
| 4,767,503 A | 8/1988 | Crescentini et al. |
| 4,769,464 A | 9/1988 | Sajtos |
| 4,783,242 A | 11/1988 | Robbins |
| 4,828,882 A | 5/1989 | Tsezos et al. |
| 4,835,153 A | 5/1989 | Kabota et al. |
| 4,840,949 A | 6/1989 | Korbonits et al. |
| 4,897,473 A | 1/1990 | Dombek |
| 4,914,226 A | 4/1990 | Di Trapani et al. |
| 4,931,584 A | 6/1990 | Bru-Magniez et al. |
| 4,932,584 A | 6/1990 | Yamazaki et al. |
| 5,021,486 A | 6/1991 | Galbo |
| 5,039,720 A | 8/1991 | Saatweber et al. |
| 5,064,507 A | 11/1991 | O'Donnell et al. |
| 5,142,098 A | 8/1992 | Bru-Magniez et al. |
| 5,162,545 A | 11/1992 | Etzbach et al. |
| 5,210,222 A | 5/1993 | O'Murchu |
| 5,227,027 A | 7/1993 | Topper |
| 5,259,835 A | 11/1993 | Clark et al. |
| 5,284,987 A | 2/1994 | Sikkenga et al. |
| 5,292,937 A | 3/1994 | Manning et al. |
| 5,312,864 A | 5/1994 | Wenz et al. |
| 5,328,687 A | 7/1994 | Leung et al. |
| 5,334,747 A | 8/1994 | Steffen |
| 5,397,812 A | 3/1995 | Usami et al. |
| 5,426,203 A | 6/1995 | Sohn et al. |
| 5,446,195 A | 8/1995 | Pacifici |
| 5,514,371 A | 5/1996 | Leung et al. |
| 5,514,372 A | 5/1996 | Leung et al. |
| 5,550,172 A | 8/1996 | Regula et al. |
| 5,565,525 A | 10/1996 | Morimoto et al. |
| 5,567,761 A | 10/1996 | Song |
| 5,575,997 A | 11/1996 | Leung et al. |
| 5,582,834 A | 12/1996 | Leung et al. |
| 5,624,669 A | 4/1997 | Leung et al. |
| 5,693,621 A | 12/1997 | Toepfer et al. |
| 5,817,742 A | 10/1998 | Toepfer et al. |
| 5,817,870 A | 10/1998 | Haas et al. |
| 5,886,219 A | 3/1999 | Steffen |
| 5,902,896 A | 5/1999 | Bauer |
| 5,952,407 A | 9/1999 | Rasoul et al. |
| 6,057,402 A | 5/2000 | Zhou et al. |
| 6,069,261 A | 5/2000 | Hoffmann et al. |
| 6,106,807 A | 8/2000 | Albayrak et al. |
| 6,143,352 A | 11/2000 | Clark et al. |
| 6,183,593 B1 | 2/2001 | Narang et al. |
| 6,210,474 B1 | 4/2001 | Romano, Jr. et al. |
| 6,211,273 B1 | 4/2001 | Bru-Magniez et al. |
| 6,225,038 B1 | 5/2001 | Smith et al. |
| 6,238,896 B1 | 5/2001 | Ozaki et al. |
| 6,245,933 B1 | 6/2001 | Malofsky et al. |
| 6,284,915 B2 | 9/2001 | Hirase et al. |
| 6,291,703 B1 | 9/2001 | Schaerfl, Jr. et al. |
| 6,376,019 B1 | 4/2002 | Leung |
| 6,395,737 B1 | 5/2002 | Defossa et al. |
| 6,395,931 B1 | 5/2002 | Carvalho et al. |
| 6,413,415 B1 | 7/2002 | Weiss et al. |
| 6,420,468 B2 | 7/2002 | Bru-Magniez et al. |
| 6,440,461 B1 | 8/2002 | Bru-Magniez et al. |
| 6,512,023 B1 | 1/2003 | Malofsky et al. |
| 6,518,677 B1 | 2/2003 | Capote et al. |
| 6,545,097 B2 | 4/2003 | Pinchuk et al. |
| 6,559,264 B1 | 5/2003 | Konig et al. |
| 6,610,078 B1 | 8/2003 | Bru-Magniez et al. |
| 6,613,934 B1 | 9/2003 | Jegelka et al. |
| 6,673,957 B2 | 1/2004 | Bartek et al. |
| 6,699,928 B2 | 3/2004 | Cobbley et al. |
| 6,716,355 B1 | 4/2004 | Hanemaaijer et al. |
| 6,750,298 B1 | 6/2004 | Bru-Magniez et al. |
| 6,794,365 B2 | 9/2004 | Al-Obeidi et al. |
| 6,841,064 B1 | 1/2005 | Weiss et al. |
| 6,936,140 B2 | 8/2005 | Paxton et al. |
| 7,070,675 B2 | 7/2006 | Schmidt et al. |
| 7,109,369 B2 | 9/2006 | Nose et al. |
| 7,169,727 B2 | 1/2007 | Thorman |
| 7,208,621 B2 | 4/2007 | Nose et al. |
| 7,226,957 B1 | 6/2007 | Scranton et al. |
| 7,305,850 B2 | 12/2007 | Tonkovich et al. |
| 7,450,290 B2 | 11/2008 | Xu et al. |
| 7,553,989 B2 | 6/2009 | Sawabe et al. |
| 7,603,889 B2 | 10/2009 | Cypes et al. |
| 7,610,775 B2 | 11/2009 | Tonkovich et al. |
| 7,649,108 B2 | 1/2010 | Schal et al. |
| 7,659,423 B1 | 2/2010 | McArdle |
| 7,663,000 B2 | 2/2010 | Dekkers et al. |
| 7,678,847 B2 | 3/2010 | Yan et al. |
| 7,771,567 B2 | 8/2010 | Rives et al. |
| 7,900,558 B2 | 3/2011 | Yokoi |
| 8,119,214 B2 | 2/2012 | Schwantes et al. |
| 8,206,570 B2 | 6/2012 | Deniau |
| 8,318,060 B2 | 11/2012 | Sundberg et al. |
| 8,425,999 B2 | 4/2013 | McArdle et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,217,098 B1 | 12/2015 | Stevenson et al. |
| 9,221,739 B2 | 12/2015 | Malofsky et al. |
| 9,234,107 B2 | 1/2016 | Malofsky et al. |
| 9,334,430 B1 | 5/2016 | Stevenson et al. |
| 9,481,640 B2 | 11/2016 | McArdle et al. |
| 2001/0005572 A1 | 6/2001 | Lobo et al. |
| 2001/0034300 A1 | 10/2001 | Yurugi et al. |
| 2002/0143128 A1 | 10/2002 | Cabioch et al. |
| 2002/0151629 A1 | 10/2002 | Buffkin et al. |
| 2003/0096069 A1 | 5/2003 | D'Alessio |
| 2003/0199655 A1 | 10/2003 | Yurugi et al. |
| 2004/0057914 A1 | 3/2004 | Bonda et al. |
| 2004/0076601 A1 | 4/2004 | Bru-Magniez et al. |
| 2004/0082043 A1 | 4/2004 | Yadav et al. |
| 2004/0086243 A1 | 5/2004 | DiGiovanni et al. |
| 2004/0220060 A1 | 11/2004 | Bartley et al. |
| 2005/0106781 A1 | 5/2005 | Ogata |

(56) References Cited

U.S. PATENT DOCUMENTS

| | | |
|---|---|---|
| 2006/0001158 A1 | 1/2006 | Matayabas, Jr. et al. |
| 2006/0073334 A1 | 4/2006 | Schwantes et al. |
| 2006/0167267 A1 | 7/2006 | Chorghade et al. |
| 2006/0197236 A1 | 9/2006 | Basheer et al. |
| 2006/0211809 A1 | 9/2006 | Kodemura et al. |
| 2007/0043145 A1 | 2/2007 | Beck et al. |
| 2007/0049655 A1 | 3/2007 | Yoshimune et al. |
| 2007/0092483 A1 | 4/2007 | Pollock |
| 2007/0222051 A1 | 9/2007 | Yoshimura et al. |
| 2008/0131618 A1 | 6/2008 | Nakamura et al. |
| 2008/0160305 A1 | 7/2008 | Warren et al. |
| 2008/0187655 A1 | 8/2008 | Markle et al. |
| 2008/0227919 A9 | 9/2008 | Li et al. |
| 2008/0241485 A1 | 10/2008 | Shimohara et al. |
| 2008/0286333 A1 | 11/2008 | Kangas et al. |
| 2009/0087151 A1 | 4/2009 | Benjamin et al. |
| 2009/0200652 A1 | 8/2009 | Oh et al. |
| 2009/0203861 A1 | 8/2009 | Lee et al. |
| 2009/0263604 A1 | 10/2009 | Arai et al. |
| 2009/0286433 A1 | 11/2009 | Watanabe |
| 2010/0016508 A1 | 1/2010 | Sasagawa et al. |
| 2010/0059179 A1 | 3/2010 | Tribelhorn et al. |
| 2010/0124649 A1 | 5/2010 | Rukavina et al. |
| 2010/0256720 A1 | 10/2010 | Overstreet et al. |
| 2010/0286438 A1 | 11/2010 | Malofsky et al. |
| 2011/0015406 A1 | 1/2011 | Umetani et al. |
| 2011/0024392 A1 | 2/2011 | Sato et al. |
| 2011/0164322 A1 | 7/2011 | Morozumi et al. |
| 2011/0244010 A1 | 10/2011 | Doshi |
| 2011/0255156 A1 | 10/2011 | Jethmalani et al. |
| 2012/0083523 A1 | 4/2012 | Richard et al. |
| 2012/0136130 A1 | 5/2012 | Takashima et al. |
| 2012/0261807 A1 | 10/2012 | Itoh et al. |
| 2012/0315388 A1 | 12/2012 | Burckhardt et al. |
| 2013/0281580 A1 | 10/2013 | Malofsky et al. |
| 2013/0303719 A1 | 11/2013 | Malofsky et al. |
| 2014/0058031 A1 | 2/2014 | Overbeek et al. |
| 2014/0173889 A1 | 6/2014 | Johnson et al. |
| 2014/0248485 A1 | 9/2014 | Malofsky et al. |
| 2014/0275400 A1 | 9/2014 | Chen et al. |
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0104660 A1 | 4/2015 | Malofsky et al. |
| 2015/0148480 A1 | 5/2015 | Ellison et al. |
| 2015/0210894 A1 | 7/2015 | Malofsky et al. |
| 2015/0303122 A1 | 10/2015 | Malofsky et al. |
| 2015/0361283 A1 | 12/2015 | Malofsky et al. |

FOREIGN PATENT DOCUMENTS

| | | | |
|---|---|---|---|
| FR | 2788516 A1 | 7/2000 | |
| GB | 432628 | 7/1935 | |
| GB | 965676 | 8/1964 | |
| GB | 965767 | 8/1964 | |
| GB | 975733 | 11/1964 | |
| JP | S5681537 A | 7/1981 | |
| JP | 02-281013 | 11/1990 | |
| JP | H08231564 | 9/1996 | |
| JP | 09258448 A | 10/1997 | |
| JP | 200019936 | 7/2000 | |
| JP | 2004-304125 A | 10/2004 | |
| JP | 2008174494 | 1/2007 | |
| JP | 2011-025247 A | 2/2011 | |
| WO | 99/46619 | 9/1999 | |
| WO | 99/55394 | 11/1999 | |
| WO | 2006-098514 A1 | 9/2006 | |
| WO | 2007/120630 | 10/2007 | |
| WO | 2010/129068 A1 | 11/2010 | |
| WO | 2011/059104 | 12/2011 | |
| WO | 2011/161045 | 12/2011 | |
| WO | 2012/054616 A2 | 4/2012 | |
| WO | 2012/054633 A2 | 4/2012 | |
| WO | 2013059473 A2 | 4/2013 | |
| WO | 2013/066629 | 5/2013 | |
| WO | 2013/149173 A1 | 10/2013 | |
| WO | 2013149165 A1 | 10/2013 | |
| WO | 2013149168 A1 | 10/2013 | |
| WO | WO 2013149165 A1 * | 10/2013 | ............... C08F 2/38 |

OTHER PUBLICATIONS

H. Jiang et al.: "Inorganic Zinc Salts Catalyzed Knoevenagel Condensation at Room Temperature without Solvent," Preparative Biochemistry & Biotechnology, (2009), vol. 39, pp. 194-200.

B. M. Reddy et al.: "An Easy-to-use Heterogeneous Promoted Zirconia Catalyst for Knoevenagel Condensation in liquid Phase under Solvent-Free conditions," Journal of Molecular Catalysis A: Chemical, (2006), vol. 258, pp. 302-307.

D. H. Jung et al.: "New and General Methods for the Synthesis of Arylmethylene Bis(3-Hydroxy-2-Cyclohexene-1-Ones) and Xanthenediones by EDDA and In(OTf)3-Catalyzed One-Pot Domino Knoevenagel/Michael or Koevenagel/Michael/ Cyclodehydration Reactions," Bull. Korean Chem. Soc. (2009) vol. 30, No. 9, pp. 1989-1995.

P. Klemarczyk: "Adhesion Studies of Mixtures of Ethyl Cyanoacrylate with a Difunctional Cyanoacrylate Monomer and with other Electron-deficient Olefins," J. Adhesion, (1999), vol. 69, pp. 293-306.

P. Klemarwczyk: "A General Synthesis of 1,1 Disubstituted Electron Deficient Olefins and their Polymer Properties," Polymer, (1998), vol. 39, No. 1, pp. 173-181.

Gill, Charansingh, et al. "Knoevenagel condensation in neutral media: A simple and efficient protocol for the synthesis of electrophillic alkenes catalyzed by anhydrous ferric sulphate with remarkable reusability." Bulletin of the Catalysis Society of India 7 (2008): 153-157.

P. Ballesteros et al.: "DI-tert-Butyl Methylenemalonate [Propanedioic Acid, Methylene-, bis(1, 1-dimethylethyl)ester]," Organic Syntheses. Coil. (1990), vol. 7, p. 142 ; (1986) vol. 64, p. 63.

A. M. Vetrova et al.: "Improvement of the Thermal Stability of Cyanoacrylate Adhesives," Polymer Science, Series D, (2009), vol. 2, No. 1, pp. 27-30.

A. C. Cope: "Condensation Reactions. I. The Condensation of Ketones with Cyanoacetic Esters and the Mechanism of the Knoevenagel Reaction," Condensation of Ketones with Cyanoacetic Esters, (1937), vol. 59, pp. 2327-2330.

G. Lai et al.: "Ionic Liquid Functionalized Silica Gel: Novel Catalyst and Fixed Solvent,"Tetrahedron Letters (2006), vol. 47, pp. 6951-6953.

J. R. Harjani et al.: "Lewis Acidic Ionic Liquids for the Synthesis of Electrophilic Alkenes via the Knoevenagel Condensation," Tetrahedron Letters, (2002), vol. 43, pp. 1127-1130.

P. Ballesteros et al.: "Synthesis of DI-tert-Butyl Methylenemalonate, a Sterically Hindered 1,1-Dicarbonyl Alkene," J. Org. Chem, (1983), vol. 48, pp. 3603-3605.

T. Doi et al.: "Synthesis of Dimethyl gloiosiphne A by Way of Palladium-Catalyzed Domino Cyclization," J. Org. Chem., (2007), vol. 72, pp. 3667-3671.

Takagi et al.: Kogyo Kagaku Zasshi, Reaction of Active Methylene Radicals with Formaldehyde. L. Synthesis of Diethyl Methylenemalonate, 1953, 56, pp. 901-903, English abstract.

McNab, Kirk-Othmer Encyclopedia of chemical Technology, Pyrolysis, Flash Vacuum, 2009, John Wiley & Sons, Inc., pp. 1-26.

Block, "Diethyl bis (hydroxymethyl) malonate" Organic Syntheses, 1973, Coll. vol. 5, p. 381 [vol. 40, p. 27 (1960); Retrieved on Apr. 4, 2014 from internet: http://www.Orgsyn.org/content/pdfs/procedures/cv5p0381.pdf] p. 381, para 1. 1781-026 WO.

Magdalini Matziari et al. "Active methylene phosphinic peptides: a new diversification approach", Organic Letters., vol. 8, No. 11, 2006, pp. 2317-2319, USACS, Washington DC, ISSN: 1523-7060.

Zaragoza Dorwald, Side Reactions in Organic Synthesis, 2005, Wiley-VCH Verlag GmbH & Co., KgaA, Weinheim, Preface. p. IX.

K. Okamura and T. Date, A Facile Conversion of Ethoxydihydropyrans to 4-Cyanoethylisoxazoles, J. Heterocyclic Chem. 33, 383 (1996).

(56) References Cited

OTHER PUBLICATIONS

Valentine G. Nenajdenko et al, Reaction of 2-Methylene-1,3-dicarbonyl Compounds Containing a CF3-Group with 1,3-Dienes Tetrahedron 56 (2000) 6549-6556.
Yamauchi et al. "Reactivity of 2-methyene-1,3-dicarbonyl compounds: catalytic enantioselective Diels-Alder reaction", Tetrahedron Asymetry 12, (2001), 3113-3118.
Cristoph Schotes et al. "Cu(I)- and C(II)-Catalyzed Cyclo- and Michael Addition Reactions of Unsaturated [beta]-Ketoesters" The Journal of Organic Chemistry, vol. 76, No. 14 dated Jul. 15, 2011 p. 5862-5866.
Alejandro Bugarin et al. "Efficient direct [alpha]-methylenation of carbonyls mediated by dissopropylammonium trifluoroacetate", Chemical Communications, vol. 46, No. 10 dated Jan. 1, 2010.
H. Hoffman et al. "Preparation and Selected Reaction of tery-Butyl 2-Methylene-3-oxoalkanoates" Chem. Ber., vol. 124 dated Jan. 1, 1991, pp. 2475-2480.
M. Yamauchi et al. "Reactivity of 2-Methylene-1, 3-dicarbonyl Compounds. 1,3-Dipolar Cycloaddition Reaction with Ethyl Diazoacetate", Chem. Pham. Bull., vol. 49, No. 12, dated Jan. 1, 2001, pp. 1638-1639.
Lawrence N J et al. "Reaction of Baylis-Hillman products with Swern and Dess-Martin oxidants", Tetrahedron Letters, Pergamon, GB, vol. 42 No. 23 dated Jun. 4, 2001, pp. 3939-3941.
Juliana Vale et al. "Efficient [alpha]-Methylenation of Carbonyl Compounds in Ionic Liquids at Room Temperature", SYNLETT, vol. 2009, No. 01, Jan. 1, 2009 (Jan. 1, 2009), pp. 75-78, XP055170349, ISSN: 0936-5214, DOI: 10.1055/s-0028-1087389 *table 2; compound 3 *.
Weiss et al. Miniemulsion Polymerization as a Means to Encapsulate Organic and Inorganic Materials, Adv. Polymer Science, 2010, pp. 1-52, DOI:10.1007/12_2010_61.
Bhatia, Encapsulation of Particles Using Brittle Subterranean Applications, Thesis submitted to College of Engineering and Mineral Resources at West Virginia University in partial fulfillment of the requirements for the degree of Master of Science in Chemical Engineering, 1999.
McFarland et al, Free Radical Frontal Polymerization with a Microencapsulated Initiator, Macromolecules 2004, vol. 37, pp. 6670-6672.
International Search Report (ISR) and Written Opinion of the Searching Authority in App. No. PCT/US2014/011068 dated as mailed May 12, 2014.
International Search Report (ISR) and Written Opinion of the Searching Authority in App. No. PCT/US2011/056903 dated as mailed Jun. 7, 2012.
International Search Report (ISR) and Written Opinion of the Searching Authority in App. No. PCT/US2011/056926 dated as mailed Feb. 28, 2012.
International Search Report (ISR) and Written Opinion of the Searching Authority in App. No. PCT/US2012/060830 dated as mailed Feb. 1, 2013.
International Search Report (ISR) and Written Opinion of the Searching Authority in App. No. PCT/US2012/060840 dated as mailed Mar. 12, 2013.
International Search Report (ISR) and Written Opinion of the Searching Authority in App. No. PCT/US2012/060837 dated as mailed Jan. 9, 2013.
International Search Report (ISR) and Written Opinion of the Searching Authority in App. No. PCT/US2013/034636 dated as mailed Jun. 20, 2013.
International Search Report (ISR) and Written Opinion of the Searching Authority in App. No. PCT/US2013/034641 dated as mailed Jun. 25, 2013.
International Search Report (ISR) and Written Opinion of the Searching Authority in App. No. PCT/US2013/034649 dated as mailed Aug. 27, 2013.
International Search Report (ISR) and Written Opinion of the Searching Authority in App. No. PCT/US2013/043711 dated as mailed Nov. 22, 2013.
International Search Report (ISR) and Written Opinion of the Searching Authority in App. No. PCT/US2013/070355 dated as mailed Mar. 19, 2014.
International Search Report (ISR) and Written Opinion of the Searching Authority in App. No. PCT/US2013/072203 dated as mailed Apr. 18, 2014.
International Preliminary Report on Patentability in App No. PCT/US2013/070355 dated as report issued May 19, 2015, 6 pages in its entirety.
M. McCoy, "A New Way to Stick" Chemical & Engineering News, vol. 26, Issue 26 (Jun. 30, 2014), pp. 17-18.
International Search Report (ISR) and Written Opinion of the Searching Authority in App No. PCT/US2015/047445 dated as mailed Nov. 30, 2015.
International Search Report (ISR) and Written Opinion of the Searching Authority in App No. PCT/US2015/047466 dated as mailed Dec. 1, 2015.
International Search Report (ISR) and Written Opinion of the Searching Authority in App No. PCT/US2015/048846 dated as mailed Dec. 4, 2015.
European Search Report of the European Patent Office, Issued in European Application No. 13770173.6-1301 / 2831124; dated as mailed on Oct. 9, 2015; 7 pages.
European Search Report of the European Patent Office, Issued in European Application No. 13767993.2-1302 / 2831185; dated as mailed on Jan. 7, 2016; 14 pages.
U.S. Appl. No. 14/948,734, filed Nov. 23, 2015.
U.S. Appl. No. 15/094,705, filed Apr. 8, 2016.
Bachman et al.: "Diethyl methylenemalonate", May 17, 1939, Eastman Kodak Company, pp. 493-501.
P. Breton et al., "New Poly(Methylidene Malonate 2.1.2) Nanoparticles: Recent Developments", Targeting of Drugs 4, NATO ASI Series, vol. 273, pp. 161-172, 1994.
Limouzin et al., "Anionic Polymerization of n-Butyl Cyanoacrylate in Emulsion and Miniemulsion" Macromolecules, vol. 36, 2003, pp. 667-674.
"Knoevenagel reaction on a molecular sieve", Li Qifang et al., Chinese Science Bulletin, vol. 12, pp. 914-917.
"Knoevenagel Condensation Over Acidic Zeolite", Zuo Bojun et al., Chinese Journal of Catalysis, vol. 23 (6), pp. 555-558.
"Comparison of the catalytic activity of MOFs and zeolites in Knoevenagel condensation", Maksym Opanasenko, et al., Catalysis Science & Technology, vol. 3 p. 500-507.
Corey et al. "Total Synthesis of Gibberellic Acid. A Simple Synthesiss of a Key Intermediate", J. Am. Chem. Soc. 1982, 104, 6129-6130.
Krishna et al. "Stereodefined Access to 3-Deoxy Sugars Through a Tandem Baylis-Hillman and Lewis Acid Catalyzed Reaction Sequence", European Journal of Organic Chemistry, 2010, 813-817.
International Preliminary Report on Patentability in App No. PCT/US2013/070355 dated as issued May 19, 2015.
International Search Report (ISR) and Written Opinion of the Searching Authority in App No. PCT/US2016/027134 dated as mailed Jul. 15, 2016, 7 pages in its entirety.
International Search Report (ISR) and Written Opinion of the Searching Authority in App No. PCT/US2016/027099 dated as mailed Jul. 15, 2016, 8 pages in its entirety.

* cited by examiner

ENCAPSULATED POLYMERIZATION INITIATORS, POLYMERIZATION SYSTEMS AND METHODS USING THE SAME

REFERENCE TO RELATED APPLICATIONS

This application is a continuation of U.S. patent application Ser. No. 14/725,532 entitled ENCAPSULATED POLYMERIZATION INITIATORS, POLYMERIZATION SYSTEMS AND METHODS USING THE SAME, filed May 29, 2015, and hereby incorporates the same application herein by reference in its entirety.

TECHNICAL FIELD

The present disclosure generally relates to polymerizable systems containing encapsulated initiator particles or materials. The polymerizable systems can be useful as one-part adhesive compositions.

BACKGROUND

Polymerizable compositions are useful components in a number of applications and products and can be used, for example, as an adhesive, a coating, a sealant, a molding, a film, or as a composite binder. Known polymerizable compositions, however, have suffered from a number of significant drawbacks that have limited their potential applications and uses. For example, addition-type polymer systems have required relatively large quantities of polymerization initiators, extensive time requirements, and intense mixing to polymerize which have limited their use to certain applications. Other known polymerizable compositions suffer from other issues that preclude widespread utility. For example, cyanoacrylate compositions suffer from short shelf-lives and difficulty in application due to inactive substrate surfaces. It would therefore be advantageous to provide a polymerizable system that exhibits improved properties including on-demand polymerization without the need for additional ex situ curing agents, superior ease-of-use, long-term shelf stability, and excellent mechanical properties.

SUMMARY

According to one embodiment, a polymerizable system includes a curable composition, and one or more encapsulated initiator particles. The curable composition includes one or more 1,1-disubstituted alkene compounds. Each of the one or more encapsulated initiator particles includes one or more polymerization initiators substantially encapsulated by a cured composition. The cured composition includes one or more 1,1-disubstituted alkene compounds. Each polymerization initiator is capable of initiating polymerization of the curable composition.

According to another embodiment, a polymerizable system includes a curable composition, and one or more encapsulated initiator particles. The curable composition includes one or more 1,1-disubstituted alkene compounds. The one or more encapsulated initiator particles include an initiator matrix. The initiator matrix includes a first cured composition and one or more polymerization initiators substantially encapsulated by the first cured composition. The first cured composition includes one or more 1,1-disubstituted alkene compounds. The one or more polymerization initiators are capable of initiating polymerization of the curable composition.

DETAILED DESCRIPTION

As will be appreciated, polymerizable systems that can be cured on-demand without a polymerization initiator can be used in many applications where initiator-cured systems that require an external initiator are either unusable or undesirable. Such initiator-cured systems can refer to systems that require an additional component, external to the system, to initiate curing. In contrast, polymerizable systems that can be cured without a polymerization initiator can refer to systems that can undergo polymerization without the introduction, or contact, of any additional components external to the system using instead, for example, encapsulated initiators dispersed in the system.

Certain initiator-cured systems are disadvantageous because they are two-part polymerization systems. Two-part polymerization systems generally refer to polymerization systems that require the addition of at least a second component to the system to initiate polymerization.

Addition-type polymerization systems are examples of a two-part polymerization system. Generally, such systems are disadvantageous as a result of the cost and environmental hazards of the initiator components, the energy and time required to mix the initiator components into the polymerizable composition, the time-sensitive application and use of the mixed system, and the continued presence of the initiator components in the cured composition. For example, addition-type acrylate and methacrylate systems require the discrete addition of a relatively large quantity (e.g., about 2% or more) of various initiator components and catalysts into a polymerizable composition to induce polymerization. In such systems, the relatively large quantity of initiator compounds must be meticulously mixed into the system and remain in the cured composition. These disadvantages are a fundamental consequence of a two-part polymerization system and cannot be alleviated by using techniques such as substrate priming or improved initiators.

Other initiator-cured systems include moisture curing systems, such as cyanoacrylate systems, that can be cured upon contact with water or moisture. Although sometimes classified as one-part systems by industry standards, such moisture-sensitive systems suffer from several consequences as a result of using an external initiator. For example, moisture-sensitive curing systems are difficult to control due to their rapid polymerization upon contact with commonly found surface moisture, which can vary widely in concentration substrate to substrate and with seasonal atmospheric humidity. As such, they are unsuitable for use in certain applications such as those pertaining to various inorganic and/or acidic substrates. Additionally, cyanoacrylates also suffer from fairly limited physical and performance versatility. Attempts to improve cyanoacrylate systems through the addition of primers or additives have increased the complexity of use as well as the expense of such systems.

A polymerizable system that can be cured without the addition of an external polymerization initiator, such as a system that can be cured with pressure or force, can avoid these issues and can be used in a wide range of applications that are unsuitable for initiator-cured polymerization systems. For example, such systems can be readily stored as a usable composition, and can be polymerized without additional components, or the time constraints and mixing required in initiator-cured systems.

A polymerizable system with improved properties, including self-initiated polymerization without the addition of any external curing agent sources, can generally include a polymerizable composition and an encapsulated polymerization initiator dispersed within the polymerizable composition. Advantageously, such polymerizable systems can alleviate many of the problems of known polymerization systems and can be cured by rupturing encapsulated polymerization initiators.

According to certain embodiments, suitable polymerizable compositions and polymerization initiators can be selected from any pair of components that react upon contact with one another to initiate polymerization. However, particularly advantageous polymerizable compositions can be 1,1-disubstituted alkene compounds having two carbonyl groups bonded to the 1 carbon and a hydrocarbyl group bonded to each of the carbonyl groups ("hereinafter 1,1-disubstituted alkene compounds"). In such 1,1-disubstituted alkene compounds, the hydrocarbyl groups can be bonded to the carbonyl groups directly or through an oxygen atom.

According to certain embodiments, suitable hydrocarbyl groups can include at least straight or branched chain alkyl groups, straight or branched chain alkyl alkenyl groups, straight or branched chain alkynyl groups, cycloalkyl groups, alkyl substituted cycloalkyl groups, aryl groups, aralkyl groups, and alkaryl groups. Additionally, suitable hydrocarbyl groups can also contain one or more heteroatoms in the backbone of the hydrocarbyl group.

In certain embodiments, a suitable hydrocarbyl group can also, or alternatively, be substituted with a substituent group. Non-limiting examples of substituent groups can include one or more alkyl, halo, alkoxy, alkylthio, hydroxyl, nitro, cyano, azido, carboxy, acyloxy, and sulfonyl groups. In certain embodiments, substituent groups can be selected from one or more alkyl, halo, alkoxy, alkylthio, and hydroxyl groups. In certain embodiments, substituent groups can be selected from one or more halo, alkyl, and alkoxy groups.

In certain embodiments, suitable hydrocarbyl groups can be $C_{1-20}$ hydrocarbyl groups. For example, the hydrocarbyl group can be an alkyl ether having one or more alkyl ether groups or alkylene oxy groups. Suitable alkyl ether groups can include, without limitation, ethoxy, propoxy, and butoxy groups. In certain embodiments, suitable hydrocarbyl groups can contain about 1 to about 100 alkylene oxy groups; in certain embodiments, about 1 to about 40 alkylene oxy groups; and in certain embodiments, about 1 to about 10 alkylene oxy groups. In certain embodiments, suitable hydrocarbyl groups can contain one or more heteroatoms in the backbone.

Suitable examples of more specific hydrocarbyl groups can include, in certain embodiments, $C_{1-15}$ straight or branched chain alkyl groups, $C_{1-15}$ straight or branched chain alkenyl groups, $C_{5-18}$ cycloalkyl groups, $C_{6-24}$ alkyl substituted cycloalkyl groups, $C_{4-18}$ aryl groups, $C_{4-20}$ aralkyl groups, and $C_{4-20}$ alkaryl groups. In certain embodiments, the hydrocarbyl group can more preferably be $C_{1-8}$ straight or branched chain alkyl groups, $C_{5-12}$ cycloalkyl groups, $C_{6-12}$ alkyl substituted cycloalkyl groups, $C_{4-18}$ aryl groups, $C_{4-20}$ aralkyl groups, or $C_{4-20}$ alkaryl groups.

As used herein, alkaryl can include an alkyl group bonded to an aryl group. Aralkyl can include an aryl group bonded to an alkyl group. Aralkyl can also include alkylene bridged aryl groups such as diphenyl methyl or propyl groups. As used herein, aryl can include groups containing more than one aromatic ring. Cycloalkyl can include groups containing one or more rings including bridge rings. Alkyl substituted cycloalkyl can include a cycloalkyl group having one or more alkyl groups bonded to the cycloalkyl ring.

In certain embodiments, suitable alkyl groups can include methyl, ethyl, propyl, isopropyl, butyl, tertiary butyl, pentyl, hexyl, and ethyl hexyl. Similarly, examples of suitable cycloalkyl groups can include cyclohexyl and fenchyl groups. Examples of suitable alkyl substituted groups can include menthyl and isobornyl groups.

According to certain embodiments, suitable hydrocarbyl groups can include methyl, ethyl, propyl, isopropyl, butyl, tertiary butyl, ethyl pentyl, hexyl, ethyl hexyl, fenchyl, menthyl, and isobornyl groups.

In certain embodiments, illustrative examples of 1,1-disubstituted alkene compounds can include methylene malonates, methylene β-ketoesters, methylene β-di-ketones, di-alkyl di-substituted vinyls, di-haloalkyl di-substituted vinyls and any monofunctional, difunctional, or multifunctional monomers, oligomers, or polymers thereof. As can be appreciated, one or more of such illustrative examples can be used as a suitable polymerizable composition according to certain embodiments.

Generally, 1,1-disubstituted alkene compounds can have a variety of properties that make them particularly suitable for use in forming a polymerizable composition. For example, 1,1-disubstituted alkene compounds can exhibit water tolerance, can be optically clear in both cured and uncured states, and can have excellent adhesion properties and cure times. Additionally, 1,1-disubstituted alkene compounds can be readily polymerized upon exposure to a mild nucleophilic (or basic) agent without requiring energy-reactive conditions or mixing. For example, 1,1-disubstituted alkene compounds can polymerize at ambient conditions (e.g., at about room temperature and pressure).

In certain embodiments, 1,1-disubstituted alkene compounds can be monofunctional, difunctional, or multifunctional. Monofunctional compounds can refer to monomers that have a single addition polymerizable group. Difunctional compounds can refer to monomers, oligomers, resins, or polymers that contain two addition polymerizable groups. Multifunctional compounds can refer to any monomer, oligomer, resin, or polymer that contains three or more addition polymerizable groups. In contrast to monofunctional compounds, certain difunctional compounds and multifunctional compounds can undergo additional crosslinking, chain extension, or both when exposed to certain suitable polymerization initiators.

An illustrative example of a monofunctional 1,1-disubstituted alkene compound is depicted by general formula I:

Formula I wherein each X can independently be O or a direct bond and R₁ and R₂ can be the same or different and can each represent a hydrocarbyl group.

An illustrative example of a multifunctional monomer having more than one methylene group connected by a multivalent hydrocarbyl group can be depicted by general formula II:

Formula II wherein each X can independently be O or a direct bond; R₃ and R₅ can be the same or different and can each represent a hydrocarbyl group; R₄ can be a hydrocarbyl group having n+1 valences; and n is an integer of 1 or greater. In certain embodiments, n can be 3 or fewer; and in certain embodiments, n can be 2 or fewer.

According to certain embodiments, specific examples of suitable polymerizable compositions can include methylene malonate compounds having general formula III:

Formula III wherein R₆ and R₇ can be the same or different and can each represent a hydrocarbyl group. For example, in certain more specific embodiments, suitable methylene malonate compounds can include one or more of diethyl methylene malonate ("DEMM"), dimethyl methylene malonate ("DMMM" or "D3M"), hexyl methyl methylene malonate ("HMMM"), ethylethoxy ethyl methylene malonate ("EE-OEMM"), fenchyl methyl methylene malonate ("FMMM"), dibutyl methylene malonate ("DBMM"), di-n-propyl methylene malonate, di-isopropyl methylene malonate, and dibenzyl methylene malonate. Additionally, in certain embodiments, certain transesterification reaction products formed from the reaction of methylene malonate compounds with acetates, diacetates, alcohols, diols, and polyols can also be used to form a suitable polymerizable composition.

According to certain embodiments, examples of suitable methylene beta ketoesters can be represented by general formula IV:

Formula IV wherein R₈ and R₉ can be the same or different and can each represent a hydrocarbyl group.

According to certain embodiments, examples of suitable methylene beta diketones can be represented by general formula V:

Formula V wherein R₁₀ and R₁₁ can be the same or different and can each represent a hydrocarbyl group.

Additional details and methods of making suitable 1,1-disubstituted alkene compounds as well as other suitable polymerizable compositions are disclosed in U.S. Pat. No. 8,609,885; U.S. Pat. No. 8,884,051; and WO 2014/110388 each of which are hereby incorporated by reference.

According to certain embodiments, a suitable polymerization initiator can generally be selected from any agent that can initiate polymerization substantially upon contact with a selected polymerizable composition. In certain embodiments, it can be advantageous to select polymerization initiators that can induce polymerization under ambient conditions and without requiring external energy from heat or radiation.

In embodiments wherein the polymerizable composition is a 1,1-disubstituted alkene compound, a wide variety of polymerization initiators can be suitable including most nucleophilic initiators capable of initiating anionic polymerization. For example, suitable initiators include alkali metal salts, alkaline earth metal salts, ammonium salts, amine salts, halides (halogen containing salts), metal oxides, and mixtures containing such salts or oxides. Exemplary anions for such salts include anions based on halogens, acetates, benzoates, sulfur, carbonates, silicates and the like. The mixtures containing such salts can be naturally occurring or synthetic. Specific examples of suitable polymerization initiators for 1,1-disubstituted alkene compounds can include glass beads (being an amalgam of various oxides including silicon dioxide, sodium oxide, and calcium oxide), ceramic beads (comprised of various metals, nonmetals, and metalloid materials), clay minerals (including hectorite clay and bentonite clay), and ionic compounds such as sodium silicate, sodium benzoate, and calcium carbonate. Other polymerization initiators can also be suitable including certain plastics (e.g., ABS, acrylic, and polycarbonate plastics) and glass-fiber impregnated plastics. Additional suitable polymerization initiators for such polymerizable compositions are also disclosed in U.S. Patent App. Publication No. 2015/0073110, which is hereby incorporated by reference.

As can be additionally appreciated, in embodiments wherein the polymerizable composition is a 1,1-disubstituted alkene compound, neither water nor atmosphere appreciably initiates polymerization of the 1,1-disubstituted alkene compounds. Such environmental tolerances limit undesirable reactivity of composition prior to curing by deliberate exposure to a polymerization initiator.

According to certain embodiments, a polymerizable initiator can be encapsulated before inclusion in a polymerizable system. Encapsulation of the polymerizable initiator inhibits reactivity of the initiator and can allow for the creation of a polymerizable system that acts as a "one-part" system. As used herein, a "one-part" system can mean that a system can be cured without the addition of any external curing agents. A one-part polymerizable system including encapsulated polymerization initiators can instead cure by rupturing the encapsulated initiator particles to expose the polymerization initiators inside of the encapsulated initiator particles. As used herein, rupturing can mean damage to the encapsulated particle or microcapsule housing the polymerization initiators, thus exposing the polymerization initiator to the surrounding environment. As can be appreciated, rupturing can occur, or can be achieved, in a variety of ways including through mechanical or thermal means such as applied force or thermal shock. However, other methods of rupturing can be further contemplated including the use of ultrasonic vibrations and laser heating.

Figure 1:
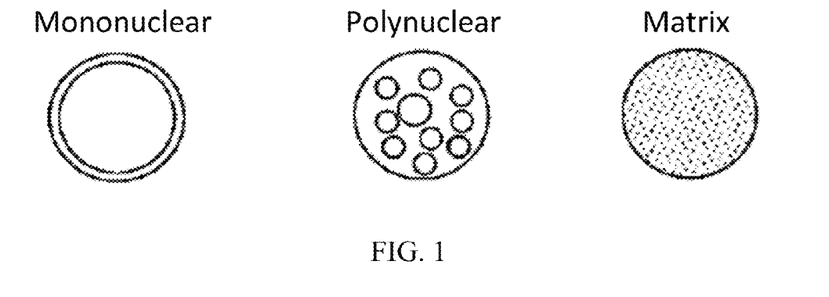
FIG. 1 pictorially depicts different types of encapsulated initiator articles.

Generally, any type of encapsulation technique can be used including, for example, encapsulation of a suitable polymerization initiator to produce a mononuclear, polynuclear, or matrix encapsulated polymerization initiators. Each of these three types of encapsulated articles are generally depicted in FIG. 1. A mononuclear polymerization initiator can include a single polymerization initiator encapsulated by a non-reactive shell. A polynuclear polymerization initiator can include several polymerization initiators, each encapsulated by a surrounding shell. An initiator matrix can be formed of polymerization initiators substantially encapsulated into a cured composition (e.g., a binder).

According to certain embodiments, a suitable matrix encapsulated initiator particle can be prepared using a two-phase synthetic scheme. In such embodiments, the synthetic scheme can include a step of forming an initiator matrix of polymerization initiators and a step of encapsulating the initiator matrix with a shell layer.

Figure 2:
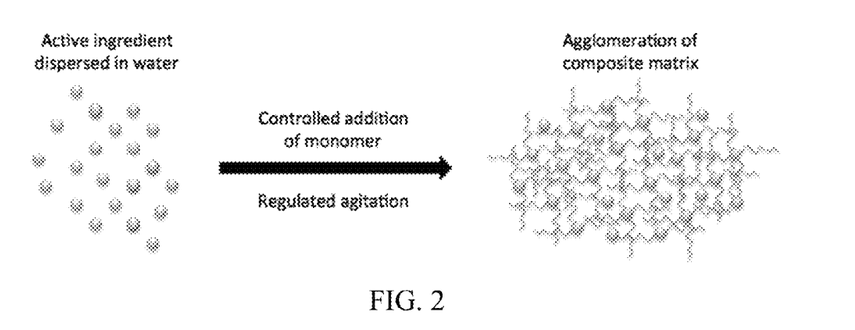
FIG. 2 pictorially depicts a matrix encapsulation of polymerization initiators according to one embodiment.

In certain embodiments, the first step of producing an initiator matrix of polymerization initiators can be performed using a matrix encapsulation process. In an illustrative matrix encapsulation process, an initiator matrix containing polymerization initiators can be formed by dispersing suitable polymerization initiators into a medium and subsequently reacting the polymerization initiators with a desired quantity of a reactive composition as depicted in FIG. 2. The reactive composition can polymerize upon contact with the polymerization initiator and can encapsulate the polymerization initiator to form an initiator matrix including polymerized monomers and polymerization initiators. Any remaining residual polymerization can then be terminated by the addition of an appropriate termination compound or agent. In certain embodiments, polymerization can occur with constant agitation of the medium.

According to certain embodiments, the step of terminating residual polymerization can improve the production and yield of initiator matrices. For example, in certain matrix polymerization processes not including a termination step, only about 50% to about 80% of the polymerization initiators can be encapsulated by the addition of a reactive composition. The addition of a termination step to the same matrix polymerization process, however, can encapsulate about 100% of the polymerization initiators. Additionally, the step of terminating residual polymerization can also prevent agglomeration of multiple matrices together by lowering the reactivity of each of the individual matrices.

In certain embodiments encapsulating a polymerization initiator, the reactive composition can be a 1,1-disubstituted alkene compound such as a methylene malonate compound. As can be appreciated, such 1,1-disubstituted alkene compounds can react upon contact with a polymerization initiator and can polymerize to form initiator matrices. In such embodiments, a suitable termination compound can be any suitable anionic polymerization terminator including, for example, mineral acids such as methanesulfonic acid, sulfuric acid, and phosphoric acid and carboxylic acids such as acetic acid and trifluoroacetic acid. In certain embodiments, a suitable anionic polymerization terminator can be trifluoroacetic acid and can be added until the medium containing the encapsulated matrices is slightly acidic (e.g., at about 6 pH).

According to certain embodiments, the reactive composition can be the same or similar to the polymerizable composition of a polymerizable system. This similarity can confer certain benefits to the system. For example, a polymerizable system can have improved stability after the step of curing the system because the cured composition will be formed only of similarly-classed polymers with good compatibility. Further, the use of 1,1-disubstituted alkene compounds can also be individually advantageous because such compounds can produce encapsulated initiators that can rupture with forces that are particularly amenable to use. For example, encapsulated initiator particles formed with methylene malonate compounds as the matrix binder can rupture when a force of about 0.1 psi or more is applied to the particle in certain embodiments, when about 0.5 psi or more is applied to the particle in certain embodiments, or when about 1 psi or more of force is applied to the particle in certain embodiments. Encapsulated initiator particles that rupture with such amenable forces can also rupture in a polymerizable composition with particularly advantageous forces. For example, such encapsulated initiator particles, when further including a shell layer and when dispersed in a polymerizable composition, can rupture and initiate curing when about 50 psi or less of force is applied to the composition in certain embodiments, when about 30 psi or less of force is applied to the composition in certain embodiments, when about 10 psi or less of force is applied to the composition in certain embodiments, or when about 5 psi or more of force is applied to the composition in certain embodiments.

According to certain embodiments, a reactive composition can also be formed of 1,1-disubstituted alkene compounds that form polymers having different glass transition temperatures ("Tg"). For example, a reactive composition can be formed of 1,1-disubstituted alkene compounds that polymerize to a low temperature Tg polymer or polymerize to an elevated temperature Tg polymer (hereinafter "low Tg 1,1-disubstituted alkene compounds" and "elevated Tg 1,1-disubstituted alkene compounds" respectively). In certain embodiments, it can also be advantageous to form a reactive composition formed of a blend of both low Tg 1,1-disubstituted alkene compounds and elevated Tg 1,1-disubstituted alkene compounds. Reactive compositions including blends of mixed glass transition temperature 1,1-disubstituted alkene compounds can prevent coalescence of the initiator matrices and/or improve the rigidity of the matrix encapsulation.

In embodiments where a reactive composition includes a blend of both low Tg and elevated Tg 1,1-disubstituted alkene compounds, the reactive composition can include various quantities of low Tg and elevated Tg 1,1-disubstituted alkene compounds. For example, in certain embodiments, about 85% to about 99%, by weight, of a reactive composition can be formed of low Tg 1,1-disubstituted alkene compounds such as hexyl methyl methylene malonate. In certain embodiments, about 90% to about 97.5%, by weight, of a reactive composition can be formed of low Tg 1,1-disubstituted alkene compounds. A low Tg 1,1-disubstituted alkene compound can have a Tg of about 0° C. or less according to certain embodiments, or a Tg of about −10° C. or less according to certain embodiments. Examples of suitable low Tg 1,1-disubstituted alkene compounds can include methylmethoxy ethyl methylene malonate (0° C.), ethylethoxy ethyl methylene malonate (−18° C.), hexyl methyl methylene malonate (−34° C.), and dibutyl methylene malonate (−44° C.).

In such reactive composition blends of low Tg and elevated Tg 1,1-disubstituted alkene compounds, at least a portion of the remaining reactive composition can be elevated Tg 1,1-disubstituted alkene compounds. For example, in certain embodiments about 1% to about 15%, by weight, of the reactive composition can be an elevated Tg 1,1-disubstituted alkene compound. In certain embodiments, about 2.5% to about 5%, by weight, of the reactive composition can be an elevated Tg 1,1-disubstituted alkene compound. Elevated Tg 1,1-disubstituted alkene compounds can have a Tg of about room temperature (e.g., about 23° C.) or greater in certain embodiments, a Tg of about 30° C. or greater in certain embodiments, or a Tg of about 50° C. or greater in certain embodiments. Non-limiting examples of suitable elevated Tg 1,1-disubstituted alkene compounds can include diethyl methylene malonate (35° C.), dimethyl methylene malonate (55° C.), phenylpropyl methyl methylene malonate (50-70° C.), menthyl methyl methylene malonate (125-135° C.), and fenchyl methyl methylene malonate (140-190° C.). Certain elevated Tg 1,1-disubstituted compounds can be suitable due to crosslinking with difunctional or multifunctional 1,1-disubstituted alkene compounds. For example, the substitution of a diethyl methylene malonate composition (Tg of 35° C.) with about 10% difunctional pentane or hexane linked ethyl methylene malonate can increase the Tg of the diethyl methylene malonate composition by about 10° C. to reach an elevated Tg of about 45-55° C. and can be used as an elevated Tg 1,1-disubstituted alkene compound.

Matrix encapsulation can occur in a medium by dispersing both a polymerization initiator and a reactive composition into the medium. Appropriate mediums for the matrix encapsulation can be selected based on the reactivity and solubility of both the polymerization initiator and the reactive composition. For example, matrix encapsulation of glass beads or clay with diethyl methylene malonate can occur in a distilled or deionized aqueous medium as neither component is reactive with water. Conversely, matrix encapsulation of a salt such as sodium silicate can necessitate the use of an organic medium such as heptane.

In certain embodiments, the properties of an encapsulated initiator particle or microcapsule can be influenced through various modifications to the initiator, the reactive monomer, or through the addition of other components.

For example, in certain embodiments, the size and shape of a polymerization initiator can be selected based upon the intended use of the polymerizable system. Larger particle sizes can be selected, for example, when the polymerizable system is intended to be used as an adhesive to bond a relatively porous substrate, such as wood or ceramics, because the larger particles can fill in gaps in the porous substrate. Conversely, a relatively small particle size can be selected when the polymerizable system is intended to be used as an adhesive to bond non-porous surfaces such as a smooth metal substrate. These changes reflect that the size and shape of the polymerization initiator can affect the rheological and mechanical properties of the system. Additionally, initiators can also act as reinforcement material in the cured polymerizable systems and thus, the size, shape, and material selected can influence the strength and rigidity of the cured systems. Examples of such reinforcing initiators can include material-based initiators such as glass beads and fibers, ceramic beads, clays, polymeric additives (i.e., thermoplastic elastomers and tougheners), woven materials, and nucleophilic silica. Generally, initiators can be in any suitable shape or form and can be, for example, spherical, non-spherical, irregular, angular, textured, or layered. Suitable polymerization initiators can generally be about 0.1 microns to about 1,000 microns in average granulometry according to certain embodiments; about 50 microns to about 750 microns in average granulometry according to certain embodiments; and about 100 microns to about 500 microns in average granulometry according to certain embodiments. Granulometry can refer to the particle size as determined through any known technique including dynamic light scattering, imaging particle analysis, calibrated sieves or filters, and optical inspection or microscopy.

Alternatively or additionally, the reactive composition can be selected, or modified, to influence several properties including the adhesion strength of the polymerizable system, the elasticity of the system, and the propensity of the encapsulated initiator particles or microcapsules to agglomerate, or coalesce, in a polymerizable system. For example, the rheological properties of a system including encapsulated initiator particles or microcapsules can be influenced by selecting a reactive composition which polymerizes to form polymers with an appropriate glass transition temperature. In certain embodiments, the reactive composition can also be modified by using more than one reactive compound. For example, a blend of an elevated Tg 1,1-disubstituted alkene compound such as, for example, diethyl methylene malonate, with a low Tg 1,1-disubstituted alkene compound such as, for example, hexyl methyl methylene malonate, can be used to prevent undesirable agglomeration, or coalescence, of the encapsulated polymerization initiators in certain polymerizable systems. The glass transition temperature of an encapsulated polymerization initiator can also be influenced by the respective glass transition temperatures of the individual reactive compounds.

According to certain embodiments, the matrix encapsulation step can include further components. For example, in certain embodiments, a suitable plasticizer can be included with a reactive composition. Generally, suitable plasticizers can include plasticizers used to modify the rheological properties of adhesive systems including, for example, straight and branched chain alkyl-phthalates such as diisononyl phthalate, dioctyl phthalate, and dibutyl phthalate, as well as partially hydrogenated terpene, trioctyl phosphate, epoxy plasticizers, toluene-sulfamide, chloroparaffins, adipic acid esters, sebacates such as dimethyl sebacate, castor oil, xylene, 1-methyl-2-pyrrolidione and toluene. Commercial plasticizers such as HB-40 manufactured by Solutia Inc. (St. Louis, Mo.) can also be suitable. The inclusion of a plasticizer can generally influence the robustness and elasticity of the particle or microcapsule. In certain embodiments, about 5% or less of a reactive monomer can be substituted with a plasticizer.

Figure 3:
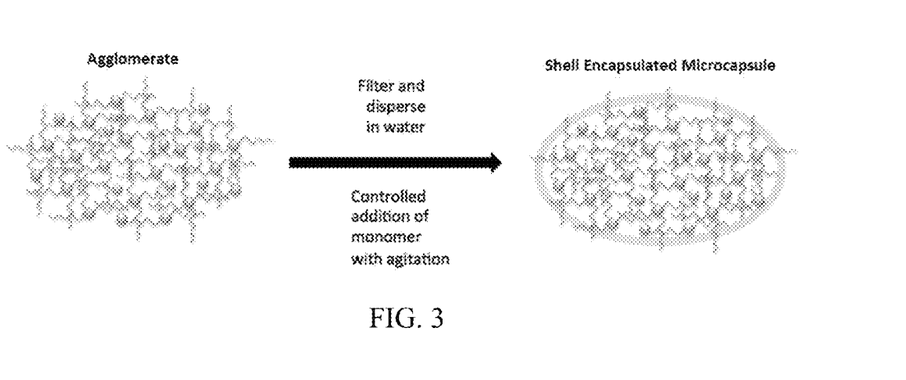
FIG. 3 pictorially depicts a shell encapsulation of an initiator matrix including polymerization initiators according to one embodiment.

In certain embodiments, the encapsulated initiator particle can still be reactive after the step of matrix encapsulation and/or be relatively tacky. Such issues can be alleviated by a second, shell encapsulation, step. In a shell encapsulation step, a shell can be polymerized around an initiator matrix by adding an additional reactive composition. Initiation of the resulting shell can occur from contact to exposed polymerization initiators on the surface of the initiator particle and, when a termination step is not performed after matrix encapsulation, by contact with active propagating polymers chains from the encapsulated initiator particles. In certain embodiments, the shell encapsulation step can occur in a medium and can occur with agitation. An example shell encapsulation step is generally depicted in FIG. 3.

As can be appreciated, the additional reactive composition can include the same reactive compound used in the matrix encapsulation step or can include a different reactive compound depending on the desired properties of the system. For example, in certain embodiments, diethyl methylene malonate can be used as the reactive compound in both the matrix encapsulation of the one or more initiators and the shell encapsulation of the initiator matrix. However, in other suitable examples, the shell layer reactive compositions can include one or more other 1,1-disubstituted alkene compounds or other compounds. For example, a suitable shell layer can be formed from a blend of diethyl methylene malonate with pentane or hexane linked difunctional monomers. Similarly to certain matrix encapsulation reactive compositions, the additional reactive composition can also, or alternatively, include a blend of 1,1-disubstituted alkene compounds that form polymers having different glass transition temperatures to improve rigidity of the shell layer and to reduce agglomeration or coalescence. In such embodiments, an elevated Tg 1,1-disubstituted alkene compound having, for example, a Tg of about room temperature or greater, or a Tg of about 50° C. or greater can be included in the additional reactive composition.

In certain embodiments, it can also be advantageous for the additional reactive composition to include difunctional or multifunctional compounds. The inclusion of difunctional and/or multifunctional compounds into the shell layer can allow for crosslinking of the cured oligomers or polymers to occur. In certain embodiments including difunctional or multifunctional compounds in the additional reactive composition, about 5% to about 15%, by weight, of the shell can be formed of the difunctional or multifunctional compounds. The resulting crosslinked shells can be stronger, with decreased permeability to the surrounding environment, and less reactive than shells formed from only monofunctional compounds. Additional modifications to the shell encapsulation step can also be performed, including, for example, the inclusion of a plasticizer.

Generally, after formation of a shell layer around the initial matrix, residual polymerization can be terminated by addition of an appropriate anionic polymerization terminator such as a weak acid (e.g., trifluoroacetic acid). The encapsulated initiator particles can then be rinsed and cleaned with deionized water. In certain embodiments, a subsequent rinsing process can be performed with a slightly acidic deionized water wash (e.g., about 6 pH) to passivate the encapsulated initiator particles.

Other techniques can also be used to prepare encapsulated polymerization initiators. For example, in certain embodiments, a matrix encapsulation step can be replaced by an alternative step that encapsulates a polymerization initiator with a non-reactive compound such as a wax compound (e.g., molten polyethylene wax). In certain embodiments, an initiator matrix formed through such alternative methods can subsequently be exposed to a reactive monomer to polymerize a shell layer.

Alternatively, in certain embodiments, the step of shell encapsulation can be replaced by other known encapsulation techniques. For example, shells could be formed around initiator matrices using one or more of a urea formaldehyde resin, a polyvinyl alcohol, a gelatin, an acrylate, or an oligomeric reactive monomer such as oligomeric isocyanate or epoxy functional resins. Other encapsulation techniques are disclosed in U.S. Patent App. Publication No. 2005/0067726, which is hereby incorporated by reference.

Encapsulated polymerization initiators can be non-reactive after encapsulation steps and can be added directly to a polymerizable composition to form a polymerizable system. However, as can be further appreciated, encapsulated polymerization initiators can also be stored separately from any polymerization composition and can then be added to the polymerizable composition at a later point prior to use. Depending upon the properties of the encapsulated polymerization initiators and the polymerizable composition, agglomeration of the encapsulated polymerization initiators can occur. In such situations, the addition of a thixotropic agent or anti-caking agent, such as fumed silica, can allow for proper dispersion of the encapsulated polymerization initiators within the polymerizable composition.

According to certain embodiments, certain polymerizable systems can also include other additional components. For example, one or more dyes, pigments, toughening agents, impact modifiers, rheology modifiers, plasticizing agents, natural or synthetic rubbers, filler agents, reinforcing agents, thickening agents, opacifiers, inhibitors, fluorescence markers, thermal degradation reducers, thermal resistance conferring agents, surfactants, wetting agents, or stabilizers can be included in a polymerizable system. For example, thickening agents and plasticizers such as vinyl chloride terpolymer (comprising vinyl chloride, vinyl acetate, and dicarboxylic acid at various weight percentages) and dimethyl sebacate respectively, can be used to modify the viscosity, elasticity, and robustness of a system. In certain embodiments, such thickening agents and other compounds can be used to increase the viscosity of a polymerizable system from about 1 to 3 cPs to about 30,000 cPs, or more.

According to certain embodiments, stabilizers can be included in a polymerizable system to increase and improve the shelf life and to prevent spontaneous polymerization. Generally, one or more anionic polymerization inhibitors such as liquid phase stabilizers (e.g., methanesulfonic acid ("MSA")), vapor phase stabilizers (e.g., trifluoroacetic acid ("TFA")), or free-radical stabilizers (e.g., 4-methoxyphenol or mono methyl ether of hydroquinone ("MeHQ")) can be used as a stabilizer package as disclosed in U.S. Pat. No. 8,609,885 and U.S. Pat. No. 8,884,051, each incorporated by reference. Additional free radical polymerization inhibitors are disclosed in U.S. Pat. No. 6,458,956 and are hereby incorporated by reference. Anionic polymerization stabilizers are generally electrophilic compounds that scavenge electrons from the composition or growing polymer chain. The use of anionic polymerization stabilizers can terminate additional polymer chain propagation. Generally, only minimal quantities of a stabilizer are needed and, in certain embodiments only about 150 parts-per-million ("ppm") or less can be included. In certain embodiments, a blend of multiple stabilizers can be included such as, for example, a blend of about 10 ppm MSA and 100 ppm MeHQ.

One-part polymerizable systems including encapsulated polymerization initiators can be used for a variety of applications. For example, in certain embodiments, the polymerizable systems can be used as an adhesive. When used as an adhesive, the polymerizable systems can have excellent properties including a viscosity of about 3,000 cPs to about 5,000 cPs, a set time of about 5 minutes to about 10 minutes on non-porous substrates, and a cure time of about 4 hours. Advantageously, such application times are amenable to both easy positioning and cleanup. Set time, as used herein, is defined as the ability of an adhesive composition to withstand a shear force of 0.2 N/mm$^2$ for 10 seconds or more. Cure time, as used herein, can mean that 75% or more of the composition has been polymerized. Once the cure time has been reached, the polymerized composition can exhibit maximum mechanical strength properties.

The one-part polymerizable systems can also have excellent shelf life. For example, such systems can have a shelf life of at least 12 days at 50° C., and/or a shelf life of 20 weeks or more at ambient temperatures. A shelf life of 12 days at 50° C. can indicate a life span under ambient conditions of about six months or more in certain embodiments, and a life span of about one year or more in certain embodiments.

The tensile shear strengths of such polymerizable systems can vary and can be, for example, 1,000 psi or more on steel, 1,100 psi or more on hard maple wood, and 900 psi or more on polycarbonate. Additionally, the polymerizable composition does not bond skin.

In certain embodiments, the polymerizable systems can also be advantageously used as a threadlocking composition. In such embodiments, a polymerizable composition can be applied to a bolt or nut. Tightening of the nut can rupture the encapsulated initiator particles via mechanical shear and expose the polymerization initiators to the polymerizable composition. Such threadlocking compositions can be advantageous because it allows for a one-part application that can be activated when the nut or bolt is tightened, irrespective of substrate composition. In contrast, known two-part polymerizable systems require application of two components to the nut or bolt and must be used immediately after application of the second component. In certain embodiments, the present threadlocking compositions can additionally exhibit stronger break-loose torques than similar, conventionally cured systems. Additionally, certain systems can also exhibit stronger resistance to heat, cold, or dissolution in various liquids and solvents. For example, a steel bolt and zinc-plated nut system treated with a threadlocking composition can have a set time of about 15 minutes to about 30 minutes and can require torque of about 12 Nm to break loose. In a second example, a threadlocking composition can have a set time of about 5 minutes and can require torque of about 29 Nm to break loose after curing of about 24 hours. Additionally, the second example can exhibit resistance to 120° C. heat, −20° C. cold, as well as resistance to gasoline, acetone, and boiling water.

EXAMPLES

A variety of encapsulated initiator particles/microcapsules and polymerizable systems are depicted in Table 1. Table 1 includes Examples 1 to 8 and depicts the components of a matrix encapsulation step.

The matrix encapsulation depicted in each of Examples 1 to 8 proceeds similarly. Initially, polymeric initiators (glass beads, sodium silicate, or clay) are uniformly dispersed in a medium ($H_2O$ or heptane) by mixing at 1,000 rpm. Subsequently, a reactive composition (DEMM, EEOEMM, or HMMM) is added dropwise to the medium and allowed to polymerize for one hour under continued agitation. Trifluoroacetic acid is then added to terminate any residual polymerization. The initiator matrices are then filtered and rinsed with deionized water. In Examples 5 and 6, a plasticizer (dimethyl sebacate) is added dropwise with the reactive monomer and included as part of the resulting matrix.

Each of Examples 1 to 8 demonstrate good encapsulation qualities. Examples 1 to 3, for example, produce high strength initiator matrices that do not crush (i.e., rupture) under applied pressure of 10 psi to 30 psi. Copolymerization with DEMM and EEOEMM in Example 4 produce elastic initiator matrices that can restore their shapes after deformations. The elastic initiator matrices of Example 4 rupture after application of minimal pressure such as hand pressure. Examples 5 and 6 incorporate a plasticizer. The incorporation of the plasticizer in Examples 5 and 6 reduce robustness and produce initiator matrices that rupture with hand pressure. However, the low glass transition temperature of HMMM in Example 6 allow for initiator matrices that are sufficiently robust for processing despite the plasticizer. Examples 7 and 8 are also suitable.

Table 2 depicts Examples 9 and 10 and illustrates the percentage of glass bead initiator particles that are encapsulated when the relative quantities of the reactive composition to the glass beads are varied. Additionally, Table 2 evaluates the effect of polymerization quenching through the addition of a weak acid. Example 9 is conducted without quenching and Example 10 includes acid quenching after polymerization. In each Example, polymerization occurs substantially similarly to Examples 1 to 8.

TABLE 2

| Ratio of Glass Beads to Reactive Monomer (grams) | Example 9 (No Quenching) | Example 10 (Quenching) |
|---|---|---|
| 0.5:1 | 79% | 100% |
| 0.75:1 | 71% | 100% |
| 1:1 | 63% | 100% |
| 2:1 | 49% | 98.9% |

TABLE 1

| Components | Example 1 | Example 2 | Example 3 | Example 4 | Example 5 | Example 6 | Example 7 | Example 8 |
|---|---|---|---|---|---|---|---|---|
| Glass Beads | 5 g | — | — | 5 g | 5 g | 5 g | 5 g | 5 g |
| Sodium Silicate | — | 5 g | — | — | — | — | — | — |
| Clay (Bentone SD-2) | — | — | 5 g | — | — | — | — | — |
| $H_2O$ | 200 g | — | 200 g | 200 g | 200 g | 200 g | 200 g | 200 g |
| Heptane | — | 200 g | — | — | — | — | — | — |
| DEMM | 2.5 g | 2.5 g | 2.5 g | 1.875 g | 2.25 g | — | — | 0.25 g |
| DMMM | — | — | — | — | — | — | 1.875 g | — |
| EEOEMM | — | — | — | 0.625 g | — | — | — | — |
| HMMM | — | — | — | — | — | 2.44 g | 0.625 g | — |
| DBMM | — | — | — | — | — | — | — | 2.25 g |
| TFA | 0.02 g | 0.02 g | 0.02 g | 0.02 g | 0.02 g | 0.02 g | 0.02 g | 0.02 g |
| Dimethyl Sebacate | — | — | — | — | 0.25 g | 0.06 g | — | — |

As depicted in Table 2, Example 9 achieves encapsulation rates of between 49% and 79% depending on the relative quantity, by weight, between the reactive monomer composition and the glass beads. Example 10, which includes acid quenching but identical ratios, has encapsulation rates between 98.9% and 100%. As such, Example 10 demonstrates that improved encapsulation efficiency results when a polymerization quenching step is performed.

Example 11 is an additional matrix encapsulation made by coating glass beads with molten brittle polyethylene wax. By volume, the wax encapsulation consisted of about 75% glass beads and 25% polyethylene wax.

Examples of shell encapsulation are made on various initiator matrices. Shell layers are formed by dispersing the matrices in water at about 700 rpm and then forming a shell layer. In each shell encapsulation, about 0.5 g of DEMM is added dropwise to the medium containing the matrices for every 5 g of polymerization initiator. Polymerization is then allowed to occur by contacting exposed polymerization initiators on the surface of the initiator matrices for about 1 hour under continued mixing. The polymerization is then terminated with the addition of 0.02 g of trifluoroacetic acid. Shell encapsulated particles are then filtered and rinsed with deionized water.

Example 12 is a polymerizable system that includes encapsulated initiator particles and a polymerizable composition. Example 12 is produced from the components depicted in Table 3; its physical properties are depicted in Table 4. The encapsulated initiator particles included in Table 3 are formed by undergoing a two-phase synthesis consisting of a matrix encapsulation step similar to the process used in Examples 1 to 8 and a shell encapsulation step similar to the previously described shell encapsulation. The encapsulated initiator particles are then incorporated into a thickened methylene malonate formulation formed from the components described in Table 3. The encapsulated initiator particles of Example 12 also demonstrate the effect of using a blend of reactive monomers having different glass transition temperatures. The encapsulated initiator particles have a glass transition temperature of −21° C. which is between the glass transition temperatures of polymerized HMMM (−34° C.) and polymerized DEMM (35° C.).

TABLE 3

(Example 12)

| | Percent |
|---|---|
| Encapsulated Initiator Particle | |
| Glass Beads | 47.50% |
| DEMM | 5% |
| HMMM | 45% |
| Dimethyl Sebacate | 2.50% |
| Polymerizable System | |
| Microcapsules | 10% |
| DEMM/DMMM Blend | 66% |
| HMMM | 11% |
| Polymeric Thickener | 13% |
| Stabilizers | Trace |

Table 4 depicts the physical properties of Example 12. As illustrated by Table 4, Example 12 exhibits excellent adhesive qualities.

TABLE 4

| Property Measured | Measurements |
|---|---|
| Viscosity (Cone and Plate at 25° C., 15-20 rpm, and 40-70% torque) | 3,000 to 5,000 cPs |
| Accelerated Shelf Life Testing | 12 days at 50° C. |
| Color (Uncured/Cured) | Transparent/Transparent |
| Odor | Sharp, sweet |
| Set Time | About 5-10 minutes on non-porous substrates |
| Open Time | 1+ hours (cure only begins after rupturing of the microcapsules) |
| Cure Time | About 4 hours |

Table 5 depicts two additional examples of polymerizable systems: Examples 13 and 14. Each of Examples 13 and 14 additionally include trace quantities of MSA (10 ppm) and MeHQ (100 ppm) which act as stabilizers for the polymerizable composition.

TABLE 5

| Components | Example 13 | Example 14 |
|---|---|---|
| Dimethyl methylene malonate | — | 65.2% |
| Diethyl methylene malonate | 65.2% | — |
| Hexyl methyl methylene malonate | 12.3% | 12.3% |
| Vinyl chloride terpolymer (thickener) | 10.5% | 10.5% |
| Hydrophobic fumed silica (thixotropic agent) | 2.0% | 2.0% |
| Micro-encapsulated glass beads | 10.0% | 10.0% |

Figure 4:
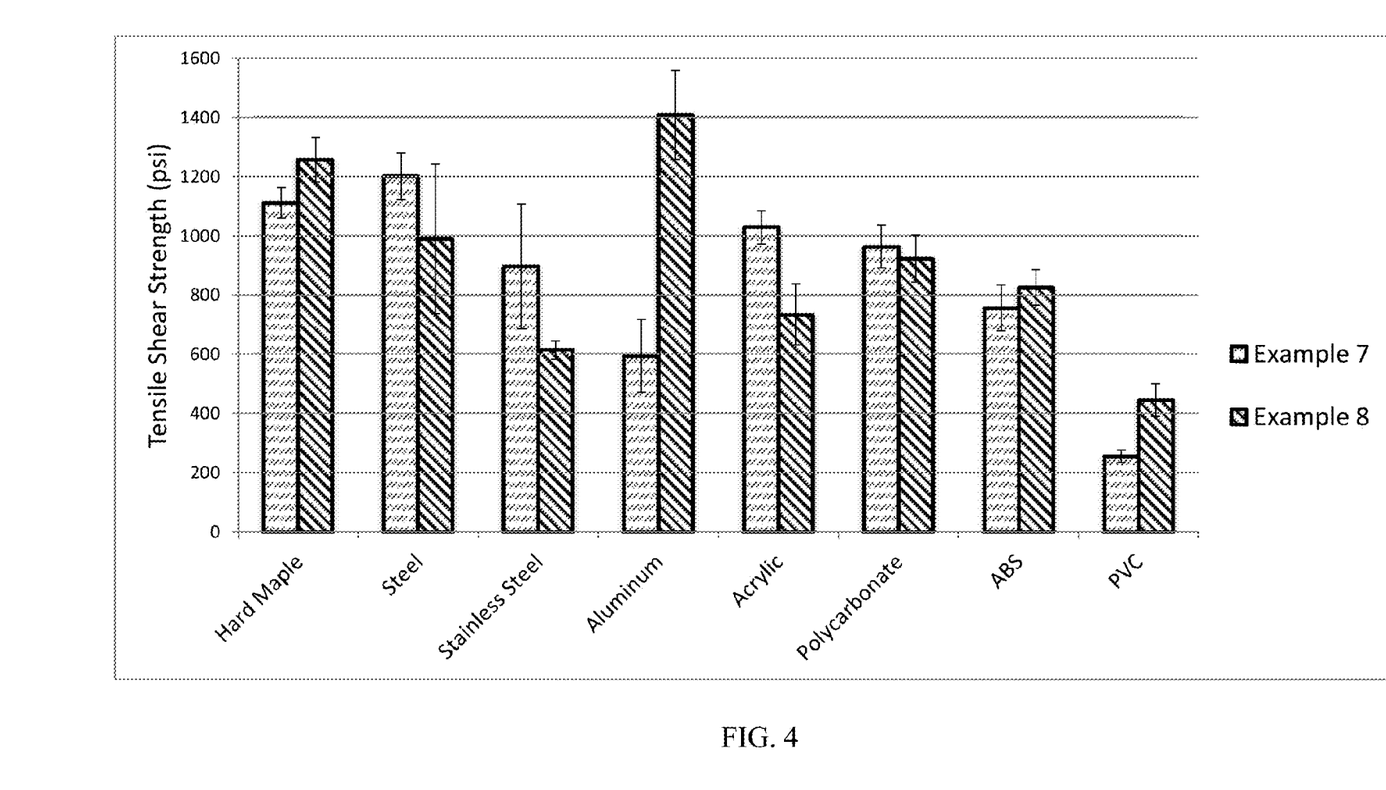
FIG. 4 is a chart depicting the tensile shear strength of example polymerizable systems on various substrates.
Figure 5:
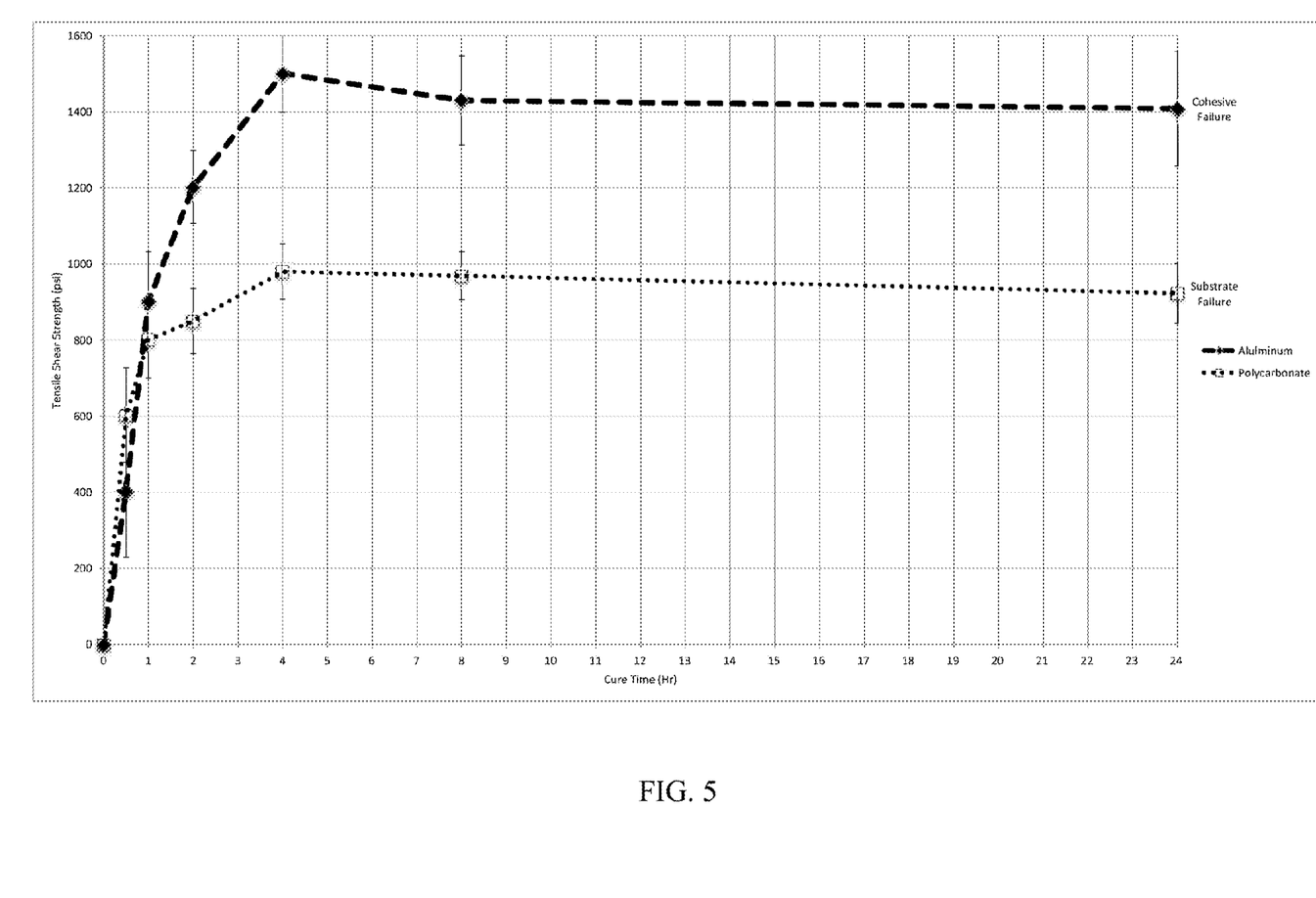
FIG. 5 is a chart depicting the tensile strength versus cure time of an example polymerizable system.

FIGS. 4 and 5 depict the tensile shear strength and cure profile of Examples 13 and 14. The tensile shear strength is measured on hard maple, steel, stainless steel, aluminum, acrylic, polycarbonate, ABS, and PVC.

Table 6 depicts the set time of Example 14 on various substrates.

TABLE 6

| Substrate | Lower Limit (min) | Upper Limit (min) |
|---|---|---|
| Hard Maple | 45 | 60 |
| Steel | 2.75 | 7 |
| Stainless Steel | 4.75 | 9.5 |
| Aluminum | 4.5 | 9 |
| Acrylic | 4 | 8.75 |
| Polycarbonate | 4.5 | 7.5 |
| ABS | 4 | 7 |
| PVC | 3.5 | 6.5 |

The polymerizable compositions are also useful as threadlocking compositions. Table 7 depicts the performance properties of two threadlocking compositions: a comparative two-part system and a one-part system incorporating microencapsulated polymerization initiators. Comparative Example 15 is a two-part diethyl methylene malonate composition that cures, by the application of a secondary sodium benzoate initiator, in 30 seconds. Inventive Example 16 includes microencapsulated polymerization initiators and cures in about 5 minutes after the microencapsulated polymerization initiators are ruptured through mechanical shear. Strength and chemical resistance of each system were measured using Grade 2 steel bolts and nuts. Results of each Example are reported as the break-loose torque (Nm) required to break the bond.

TABLE 7

| Break-Loose Torque (Nm) | Comparative Example 15 | Inventive Example 16 |
| --- | --- | --- |
| After 1 Hour | 16 | 15 |
| After 24 Hours | 28 | 29 |
| After exposure to 120° C. | 16 | 24 |
| After exposure to −20° C. | 17.5 | 25 |
| After exposure to gasoline | 11.5 | 18.5 |
| After exposure to acetone | 14 | 23 |
| After exposure to boiling water | 18 | 27 |

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

It should be understood that certain aspects, features, structures, or characteristics of the various embodiments can be interchanged in whole or in part. Reference to certain embodiments means that a particular aspect, feature, structure, or characteristic described in connection with certain embodiments can be included in at least one embodiment and may be interchanged with certain other embodiments. The appearances of the phrase "in certain embodiments" in various places in specification are not necessarily all referring to the same embodiment, nor are certain embodiments necessarily mutually exclusive of other certain embodiments. It should also be understood that the steps of the methods set forth herein are not necessarily required to be performed in the orders described, and the order of the steps of such methods should be understood to be merely exemplary. Likewise, additional steps can be included in such methods, and certain steps may be omitted or combined, in methods consistent with certain embodiments.

What is claimed is:

1. A polymerizable system comprising:
   a curable composition comprising one or more 1,1-disubstituted alkene compounds; and
   one or more encapsulated initiator particles, each of the one or more encapsulated initiator particles comprising:
   one or more polymerization initiators substantially encapsulated by a cured composition comprising one or more 1,1-disubstituted alkene compounds;
   wherein each polymerization initiator is capable of initiating polymerization of the curable composition, and wherein the one or more polymerization initiators comprise spherical, non-spherical, irregular, angular, textured or layered particles having an average granulometry of about 0.1 microns to about 1,000 microns.

2. The polymerizable system of claim 1, wherein the one or more encapsulated initiator particles are dispersed in the curable composition.

3. The polymerizable system of claim 1, wherein the one or more 1,1-disubstituted alkene compounds of the curable composition and the one or more 1,1-disubstituted alkene compounds of the cured composition are each selected from the group consisting of methylene malonates, methylene β-ketoesters, methylene β-diketones, dialkyl disubstituted vinyls, dihaloalkyl disubstituted vinyls, monofunctional, difunctional or multifunctional monomers, oligomers, or polymers thereof, and combinations thereof.

4. The polymerizable system of claim 1, wherein the one or more 1,1-disubstituted alkene compounds of the curable composition and the one or more 1,1-disubstituted alkene compounds of the cured composition are different.

5. The polymerizable system of claim 1 further comprises one or more of a plasticizer, a stabilizer, a thickening agent, and a thixotropic agent.

6. The polymerizable system of claim 1 has a viscosity of about 1 cPs to about 30,000 cPs.

7. The polymerizable system of claim 1 can be applied to a substrate and initiate polymerization of the curable composition when one or more of said encapsulated initiator particles is ruptured.

8. The polymerization system of claim 7, wherein said encapsulated initiator particles can be ruptured through about 5 psi of mechanical force applied to the polymerizable system.

9. The polymerizable system of claim 1 is an adhesive composition or a threadlocking composition and wherein the system has a set time of about 1 hour or less and a cure time of about 4 hours or less.

10. The polymerizable system of claim 1 has a shelf life of about 20 weeks or more at ambient conditions.

11. The polymerizable system of claim 1, wherein the ratio of the cured composition to the one or more polymerization initiators is a ratio of about 1:1 to about 2:1, by weight.

12. The polymerizable system of claim 1, wherein the one or more polymerization initiators comprise one or more alkali metal salts, alkaline earth metal salts, ammonium salts, amine salts, halides, or metal oxides.

13. The polymerizable system of claim 1, wherein the encapsulated initiator particles are mononuclear or polynuclear encapsulated initiator particles.

14. The polymerizable system of claim 1, wherein the encapsulated initiator particles further comprise a shell layer surrounding and encapsulating the encapsulated initiator particles.

15. A polymerizable system comprising:
- a curable composition comprising one or more 1,1-disubstituted alkene compounds; and
- one or more encapsulated initiator particles comprising:
  - an initiator matrix comprising:
    - a first cured composition comprising one or more 1,1-disubstituted alkene compounds; and
    - one or more polymerization initiators substantially encapsulated by the first cured composition;
- wherein the one or more polymerization initiators are capable of initiating polymerization of the curable composition, and wherein the ratio of the cured composition to the one or more polymerization initiators is a ratio of about 1:1 to about 2:1 by weight.

16. The polymerizable system of claim 15, wherein the encapsulated initiator particle further comprises a shell layer, wherein the shell layer surrounds and encapsulates the initiator matrix.

17. The polymerizable system of claim 16, wherein the shell layer is formed of one or more of a second cured composition formed of one or more 1,1-disubstituted alkene compounds; a urea formaldehyde resin; a polyvinyl alcohol; a gelatin; an acrylate; and a cured oligomeric reactive monomer.

18. The polymerizable system of claim 15, wherein the one or more polymerization initiators comprise spherical, non-spherical, irregular, angular, textured, or layered particles having an average granulometry of about 0.1 microns to about 1,000 microns.

* * * * *